(12) United States Patent
Neff

(10) Patent No.: US 8,102,611 B2
(45) Date of Patent: Jan. 24, 2012

(54) BACKLASH REDUCING DEVICE FOR AN OBJECTIVE LENS ASSEMBLY

(75) Inventor: Todd Neff, Salem, VA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 252 days.

(21) Appl. No.: 12/238,687

(22) Filed: Sep. 26, 2008

(65) Prior Publication Data
US 2010/0079878 A1    Apr. 1, 2010

(51) Int. Cl.
*G02B 7/02* (2006.01)
(52) U.S. Cl. ...................................... 359/822
(58) Field of Classification Search ............ 359/819–825
See application file for complete search history.

(56) References Cited

U.S. PATENT DOCUMENTS

| | | | |
|---|---|---|---|
| 2,667,624 A * | 1/1954 | Bels | 336/192 |
| 4,887,887 A * | 12/1989 | Hart | 359/830 |
| 4,958,970 A * | 9/1990 | Rose et al. | 411/12 |
| 5,335,115 A * | 8/1994 | Kawai et al. | 359/696 |
| 5,537,261 A * | 7/1996 | Palmer | 359/819 |
| 5,548,450 A | 8/1996 | Kang | |
| 5,867,313 A * | 2/1999 | Schweitzer et al. | 359/418 |

FOREIGN PATENT DOCUMENTS

| | | |
|---|---|---|
| DE | 10204380 | 1/2002 |
| GB | 2394789 | 5/2004 |
| JP | 61084616 | 10/1984 |
| JP | 04219709 | 12/1990 |
| JP | 200543752 | 7/2003 |
| JP | 2007156204 | 12/2005 |

OTHER PUBLICATIONS

Phipps, Alan, Examiner GB Intellectual Property Office, Search Report for GB0913296.0, dated Sep. 17, 2009.
Clynch, Conal, Examiner GB Intellectual Property Office, Search Report for related Application No. GB0913296.0, dated Jun. 27, 2011.

* cited by examiner

*Primary Examiner* — Scott J Sugarman
*Assistant Examiner* — Vipin Patel
(74) *Attorney, Agent, or Firm* — RatnerPrestia

(57) ABSTRACT

An objective lens assembly for night vision goggles including an objective lens cell having a threaded portion, an optical bench having a mating threaded portion for receiving the objective lens cell, and a snap-ring washer for reducing backlash between the objective lens cell and the optical bench. The objective lens cell includes a first wall radially extending away from an axial neck portion, the optical bench includes a second wall radially extending toward the axial neck portion and oriented substantially parallel to the first wall, and the snap-ring washer circumferentially surrounds the axial neck portion of the objective lens cell. The biasing element is configured for a relaxed mode of operation and a compressed mode of operation. In the relaxed mode, the snap-ring washer is inactive, and in the compressed mode, the snap-ring washer reduces backlash between the lens cell and the optical bench.

11 Claims, 8 Drawing Sheets

BACKLASH REDUCING DEVICE FOR AN OBJECTIVE LENS ASSEMBLY

FIELD OF THE INVENTION

This invention relates, generally, to objective lens assemblies. More specifically, the present invention relates to an objective lens assembly including a biasing device for reducing backlash between the threads of an objective lens cell and mating threads of its housing.

BACKGROUND OF THE INVENTION

Objective lens assemblies may be incorporated into a number of devices, such as night vision devices or other optical systems. Each lens assembly typically includes an objective lens cell and a housing, where the objective lens cell is inserted in a tubular section of the housing. A set of female threads on the inner tubular section of the housing mates corresponding male threads on the outer surface of the lens cell. By translating the objective lens cell relative to the housing, along an optical axis, the objective lens assembly focuses upon an external subject. The threaded coupling between the objective lens cell and the housing has a tolerance sufficient to allow for a loose fit between the threads.

Because of the need for a loose fit between the mated threads, the coupling between the housing and the lens cell introduces backlash. Backlash is the free play that exists between coupled elements, which may be measured as the distance in which one element is displaced before any movement is imparted to the other element in the coupling. The backlash displaces the lens cell along the optical axis until a thread of the lens cell engages an adjacent thread of the housing. Backlash causes focus and resolution errors in the objective lens assembly which may require disassembly and repair.

It would thus be beneficial to provide a device to reduce backlash in objective lens assemblies. The present invention provides a biasing device to reduce backlash, as will be described below.

SUMMARY OF THE INVENTION

The present invention is directed to an objective lens assembly including an objective lens cell having a threaded portion, an optical bench having a mating threaded portion for receiving the objective lens cell, and a biasing element. The biasing element reduces backlash between the objective lens cell and the optical bench. The biasing element may be either a belleville washer, a snap-ring washer, or any other type of washer. The biasing element is configured for a relaxed mode of operation and a compressed mode of operation. In the relaxed mode, the biasing element is inactive, and in the compressed mode, the biasing element reduces backlash between the objective lens cell and the optical bench.

Another embodiment of the present invention includes a biasing device configured for insertion around a neck of a tubular assembly. The biasing device includes a substantially annular body having a frusto-conical configuration. The frusto-conical configuration is formed with respect to a vertical axis extending normally from the annular body. The annular body further includes a discontinuity defined by a first ring end and a second ring end forming an opening there between.

Another embodiment of the present invention includes an objective lens assembly for night vision goggles including an objective lens cell having a threaded portion, an optical bench having a mating threaded portion for threadingly receiving the objective lens cell, and a biasing element. The biasing element reduces backlash between the objective lens cell and the optical bench. The biasing element may be either a belleville washer or a snap-ring washer. The biasing element is configured for a relaxed mode of operation and a compressed mode of operation. In the relaxed mode, the biasing element is inactive, and in the compressed mode, the biasing element reduces backlash between the objective lens cell and the optical bench.

It is understood that the foregoing general description and the following detailed description are exemplary, but are not restrictive, of the invention.

BRIEF DESCRIPTION OF THE FIGURES

The invention may be best understood from the following detailed description when read in connection with the accompanying figures. Included in the drawing are the following figures.

DETAILED DESCRIPTION OF THE INVENTION

Figure 1A:
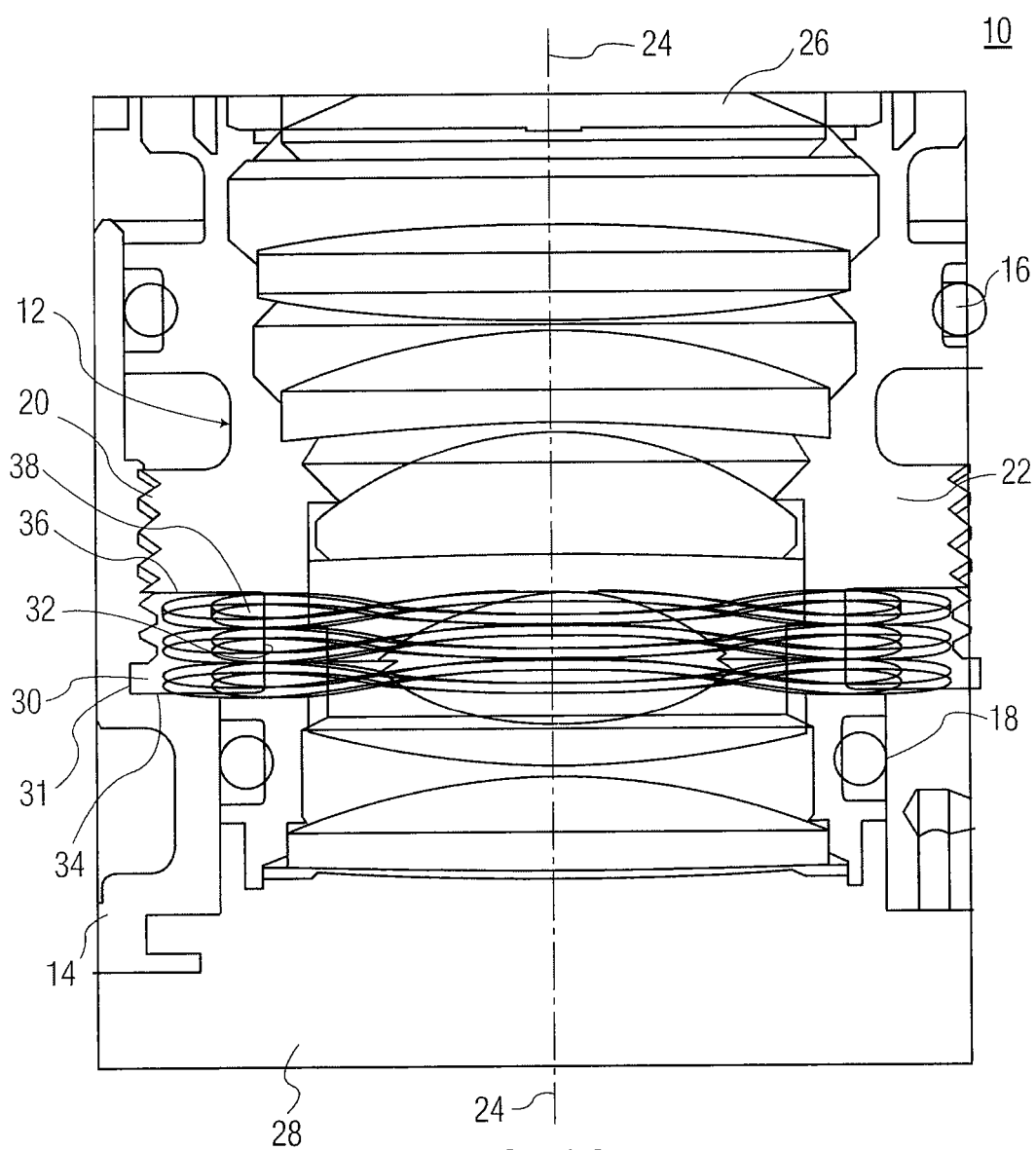
FIG. 1A shows a longitudinal side view of an objective lens assembly including a wave spring for biasing the objective lens cell against its housing.

Certain terminology is used herein for convenience only and is not to be taken as a limitation on the present invention. The terminology includes words specifically mentioned, derivatives thereof and words of similar import. As used herein, the term "input" (also referred to as near focus) is defined to mean a direction farther from a user when the objective lens assembly is in a use position as described herein and "output" (also referred to as focus at infinity) is defined to mean a direction closer to the user when the objective lens assembly is in a use position as described herein.

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

Referring to the drawings generally, objective lens assembly 10 according to an embodiment of the present invention is shown. The objective lens assembly may be incorporated into a night vision goggle (NVG) binocular, or monocular. These devices are used to intensify ambient or infrared light for enhanced visibility in a darkened environment.

Referring to FIG. 1A, objective lens assembly 10 is tubularly shaped, with input end 26, receiving light from an external environment, and output end 28, transmitting an intensified image to a user. The components of objective lens assembly 10 include optical bench 14, objective lens cell 12 and wave spring 38. The optical bench provides a housing for the objective lens cell. While FIG. 1A shows multiple lenses comprising the objective lens cell, those skilled in the art will recognize that the objective lens cell may include only a single lens.

The inner surface 31 of the optical bench includes female threads 20 that are configured to mate with corresponding male threads on collar 22 of the objective lens cell. The threads secure the lens cell within the optical bench and allow the user to focus the objective lens assembly upon an external subject, by translating along optical axis 24 of the objective lens cell relative to the optical bench. The optical bench and lens cell are sealed from the environment by first O-ring 16 and second O-ring 18 to keep moisture and dirt from entering the internal structure of the objective lens assembly, as well as provide EMI protection.

The thread tolerance between the optical bench and objective lens cell allows for the introduction of backlash. Backlash is the free play that exists between coupled elements and may be measured as the distance in which one element of the coupled elements is displaced before any movement is imparted to the other element. Backlash may arise from the accumulation of tolerances between the elements as well as from surface wear of the elements. In the objective lens assembly, even the tightest tolerance between threads may result in a backlash that displaces the lens cell, for example from 0.001 to 0.010 mm along the optical axis, before a thread of the lens cell engages an adjacent thread of the optical bench. Such backlash is inherent in the threading, because it is designed to allow a loose fit between the mated threads. Backlash of this magnitude is undesirable, and may result in focus and resolution errors, requiring the objective lens assembly to be disassembled and rebuilt. It will be appreciated that the amount of backlash depends on the type of thread, the class of thread and other thread characteristics.

Figure 1B:
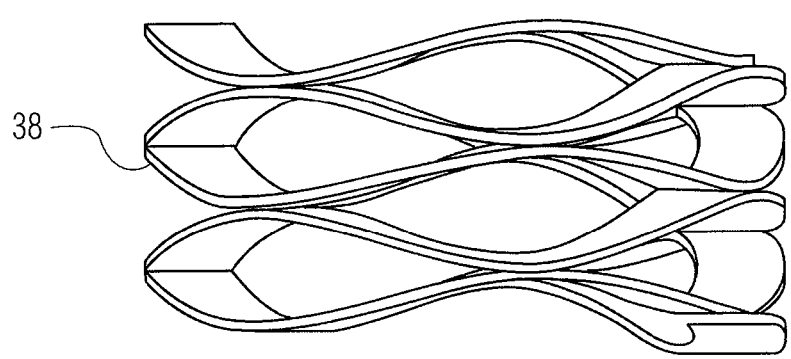
FIG. 1B shows an uncompressed wave spring.

According to a first exemplary embodiment of the invention, a wave spring 38 may be used as a biasing member to reduce backlash between the threaded collar of the lens cell and the threaded inner surface of the optical bench. Referring to FIG. 1B, the wave spring is a coiled flat wire which is twisted along its longitudinal dimension to provide a spring effect. Referring back to FIG. 1A, the objective lens cell includes axial neck 32. The base 36 of the threaded collar is formed by a wall radially extending away from the axial neck. The optical bench includes shoulder 34, which is formed by a wall radially extending toward the neck and oriented substantially parallel to the base of the threaded collar.

A gap 30 is formed by the space between (a) opposing base 36 of the threaded collar and shoulder 34 of the optical bench and (b) opposing inner surface 31 and axial neck 32. The wave spring circumferentially surrounds the neck of the lens cell and is disposed in the gap between base 36 of the threaded collar and shoulder 34 of the optical bench. As the lens cell translates along optical axis 24 towards output end 28, the wave spring is compressed between the base of the threaded collar and the shoulder of the optical bench. As the wave spring is compressed, the wave spring biases the threaded collar against the threaded inner surface of the optical bench. Moreover, as the wave spring is decompressed, when the lens cell translates along the optical axis towards input end 26, the biasing force still continues to a lesser degree. The wave spring is never fully decompressed and never reaches a relaxed or inactive state. This is a disadvantage, which the present invention addresses, as described later below.

Figure 2:
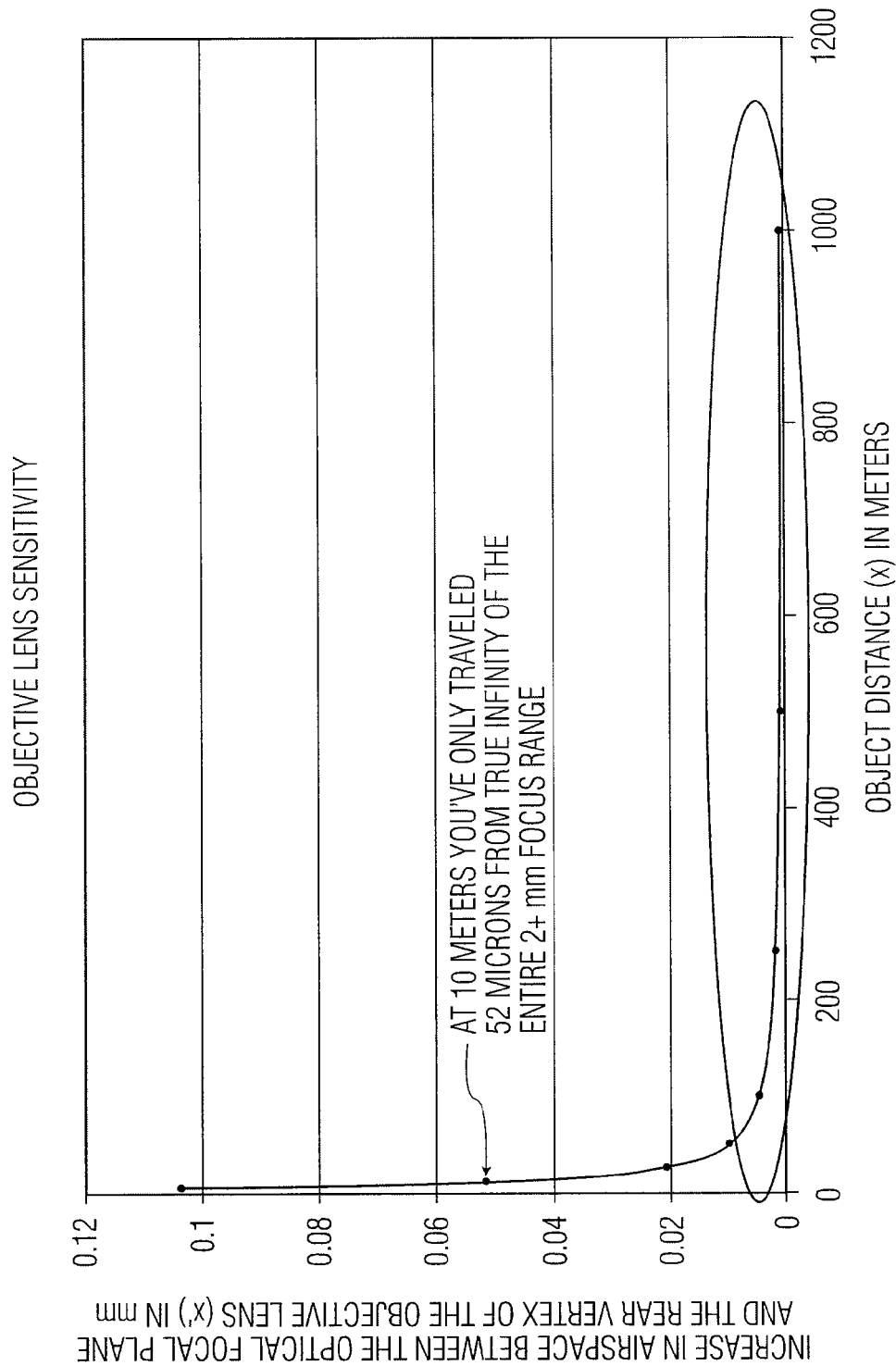
FIG. 2 is a graph of gap distance between an optical focal plane of the objective lens cell and a rear vertex of the objective lens cell as a function of object distance.

Referring to FIG. 2, objective lens sensitivity is shown as a relationship between object distance versus an increase in gap distance between the optical focal plane of the objective lens and the rear vertex of the objective lens. The Y-axis represents the increase in distance in millimeters, and the X-axis represents object distance in meters. As the object is positioned further away from the user, focusing is performed by translating the lens cell along the optical axis towards output end 28, thereby decreasing the distance of space in gap 30 between shoulder 34 of the optical bench and base 36 of the threaded collar.

As shown, the critical range of objective lens sensitivity occurs when the shoulder of the optical bench is closest to the base of the threaded collar. The effective focal length (EFL) of the objective lens cell, which also determines magnification and hence image size, is constant. As the object distance increases, the distance between the base of the threaded collar and the shoulder of the optical bench decreases, and vice versa. This relationship is given by $$f^2 = xx'$$

where: f is the EFL, x is the object distance, and x' is the distance between the base of the threaded collar and the shoulder of the optical bench.

Supporting calculations for the objective lens sensitivity, shown in FIG. 2 and included in Table 1 below, are based on an EFL of 22.58 millimeters for an objective lens assembly of Project 1 and an EFL of 21.139 millimeters for an objective lens assembly of Project 2. An EFL tolerance of +/−0.25 millimeters is assumed for both assemblies.

For these two objective lens assemblies, the increase in distance between the shoulder of the optical bench and the base of the threaded collar is less than 0.11 millimeters for all objects positioned from 5 meters to infinity away from the viewer. Thus, only a small focus adjustment with respect to the full 2+ millimeter focus range is needed for viewing a large variation in object distances. For example, a distance between the focal plane of the objective lens cell and the rear vertex of the objective lens cell changes less than 100 microns over a change in focus distance to the object from infinity to approximately 10 meters.

TABLE 1

Exemplary Calculations

| Object Distance (x)(m) | Project 1+ x'(mm) | Project 1− x' (mm) | Project 2+ x' (mm) | Project 2− x' (mm) |
|---|---|---|---|---|
| 1000000 | 5.21209E−07 | 4.98629E−07 | 4.57489E−07 | 4.3635E−07 |
| 10000 | 5.21209E−05 | 4.3635E−05 | 4.57489E−05 | 4.3635E−05 |
| 5000 | 0.000104242 | 8.72701E−05 | 9.14979E−05 | 8.72701E−05 |
| 1000 | 0.000521209 | 0.00043635 | 0.000457489 | 0.00043635 |
| 500 | 0.001042418 | 0.000872701 | 0.000914979 | 0.000872107 |
| 250 | 0.002084836 | 0.001745401 | 0.001829957 | 0.001745401 |
| 100 | 0.005212089 | 0.004363503 | 0.004574893 | 0.004363503 |
| 50 | 0.010424178 | 0.008727006 | 0.009149786 | 0.008727006 |
| 25 | 0.020848356 | 0.017454013 | 0.018299573 | 0.017454013 |
| 10 | 0.05212089 | 0.043635032 | 0.045748932 | 0.043635032 |
| 5 | 0.10424178 | 0.087270064 | 0.091497864 | 0.087270064 |
| 1 | 0.5212089 | 0.436350321 | 0.457489321 | 0.436350321 |
| 0.5 | 1.0424178 | 0.872700642 | 0.914978642 | 0.872700642 |
| 0.25 | 2.0848356 | 1.745401284 | 1.829957284 | 1.745401284 |

Figure 3A:
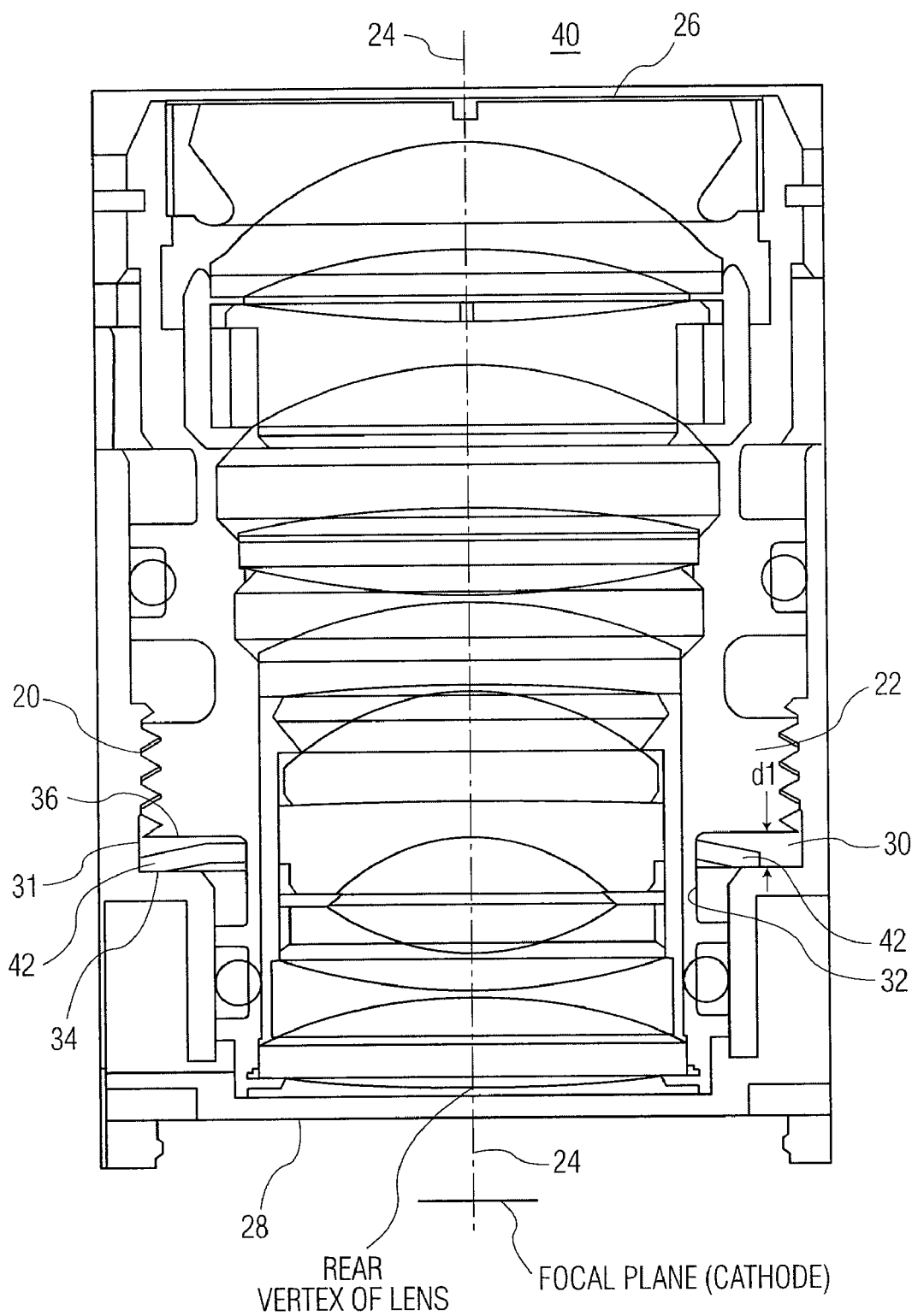
FIG. 3A shows a longitudinal side view of an objective lens assembly incorporating a snap-ring washer in which the snap-ring washer is not compressed, in accordance to an embodiment of the present invention.
Figure 3B:
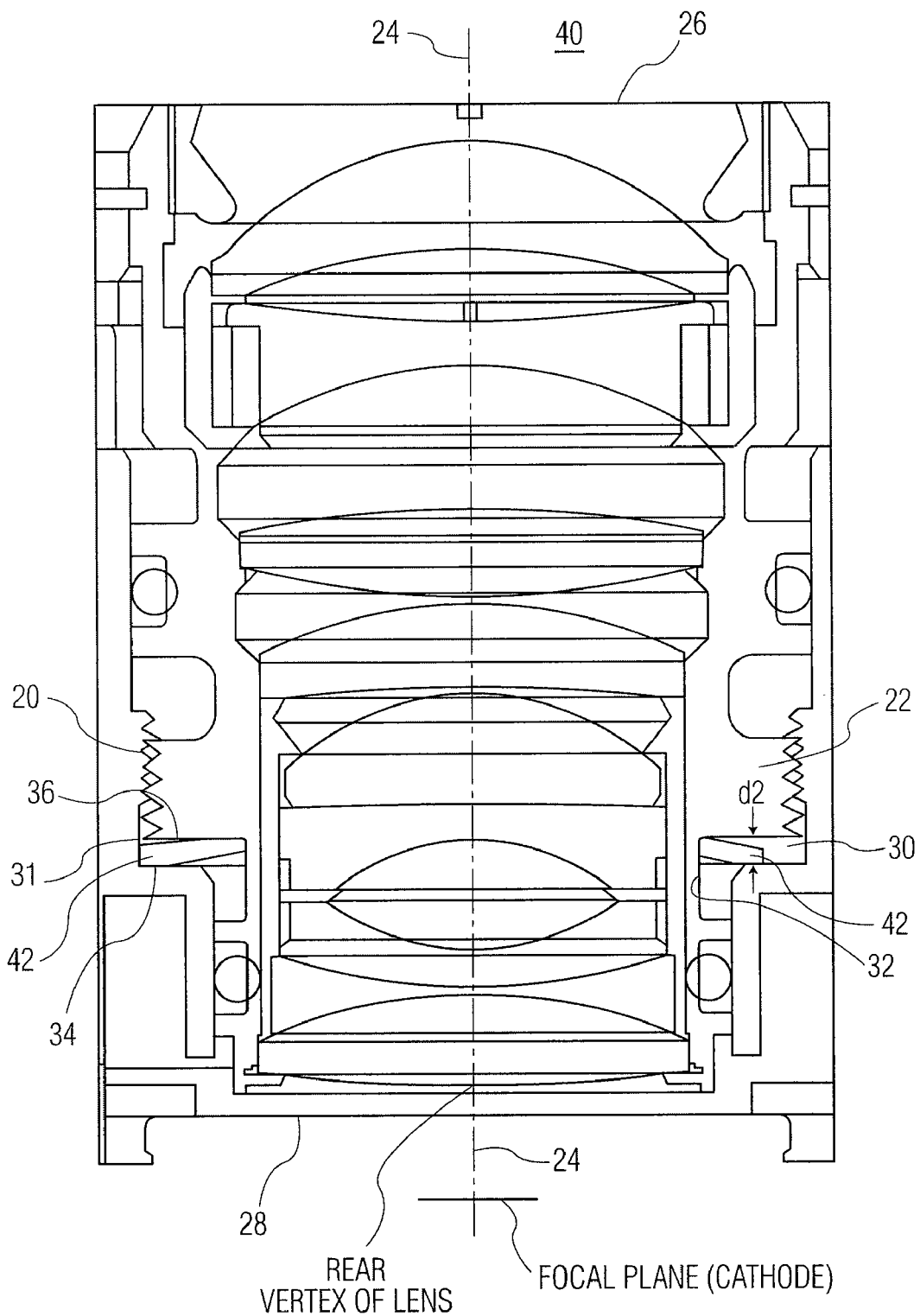
FIG. 3B shows a longitudinal side view of an objective lens assembly incorporating a snap-ring washer in which the snap-ring washer is becoming compressed, in accordance to an embodiment of the present invention.
Figure 3C:
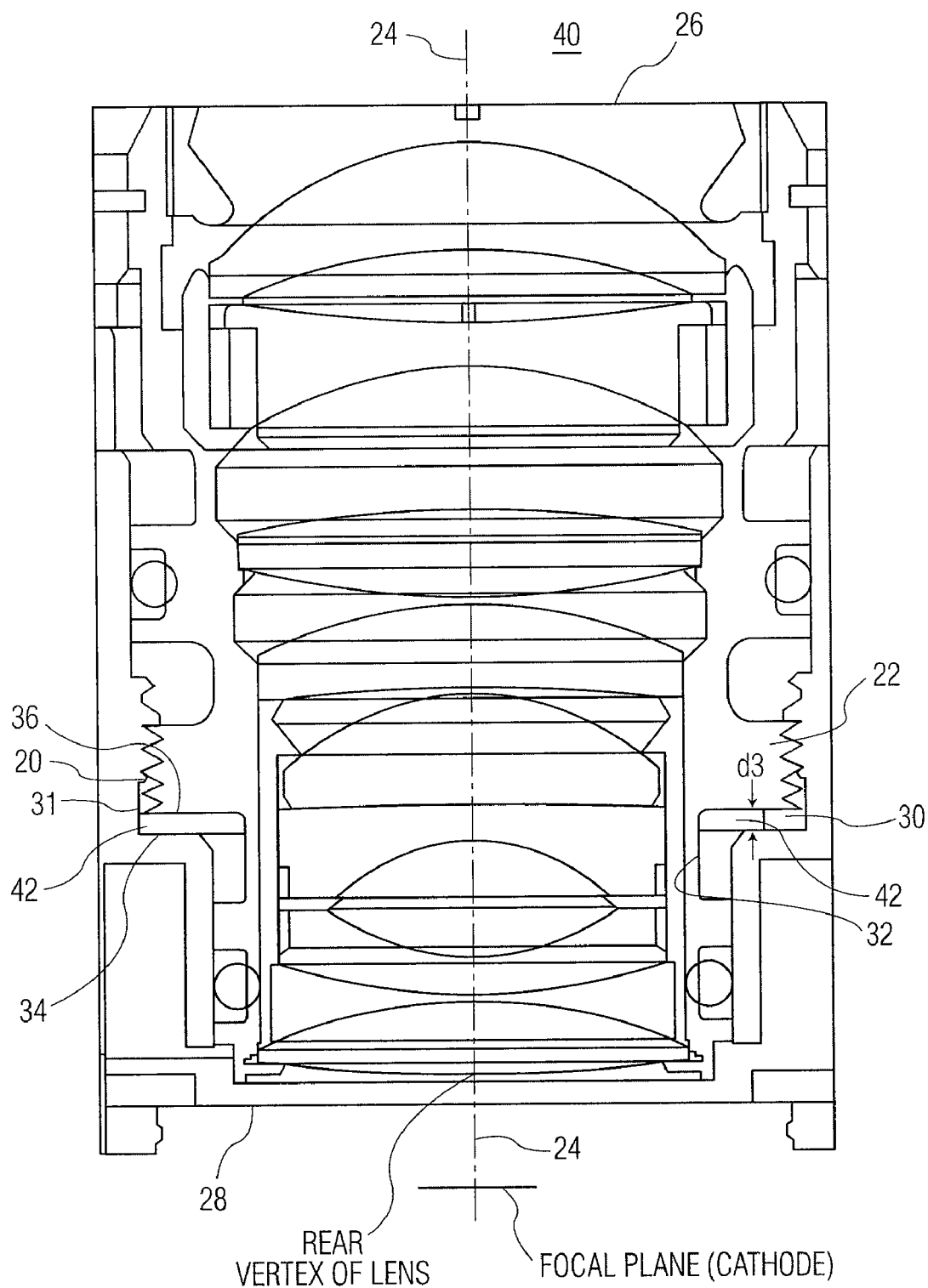
FIG. 3C shows a longitudinal side view of an objective lens assembly incorporating a snap-ring washer in which the snap-ring washer is fully compressed, in accordance to an embodiment of the present invention.

According to an exemplary embodiment of the invention, there is shown objective lens assembly 40 in FIGS. 3A, 3B and 3C, in which gap 30 is sequentially made smaller by reducing distance d between shoulder 34 and base 36. As further described below, snap ring washer 42, is positioned to surround axial neck 32 of the lens cell between its base 36 and shoulder 34 of the optical bench. The snap ring washer reduces backlash between threaded collar 22 and threaded inner surface 31 of the optical bench. Unlike objective lens assembly 10, however, in which wave spring 38 is biasing the threaded collar against the threaded inner surface over the entire translation distance of the lens cell, the snap ring washer in objective lens assembly 40, however, provides biasing for only a limited range in accordance with FIG. 2.

Figure 4A:
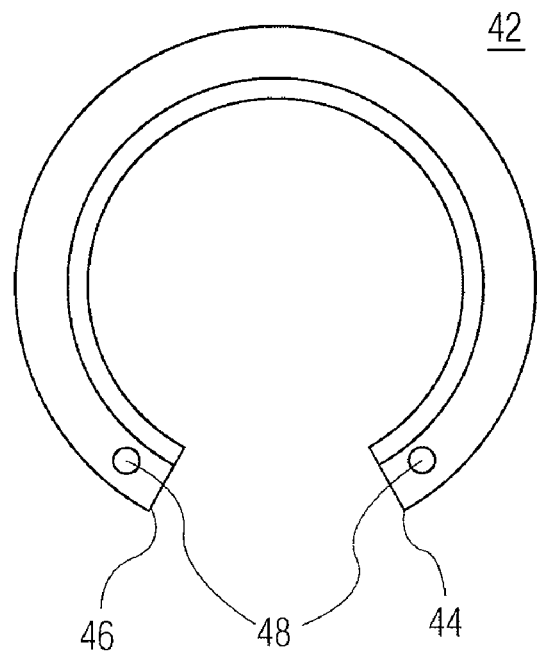
FIG. 4A shows a top view of a snap-ring washer.

An exemplary snap ring washer in a rest state is shown in FIG. 4A. The snap-ring washer includes a substantially circular shaped body with a frusto-conical configuration along a normal line extending from its axial center. The snap-ring washer is further characterized by a circumferential discontinuity defined by first ring end 44 and second ring end 46 forming an opening there between. The opening permits clasping of the snap-ring washer around axial neck 32 of the lens cell. Optional holes 48 may be provided to allow use of pliers for grasping the snap ring washer at holes 48. The pliers may be used to squeeze the holes towards each other, thereby collapsing the snap ring washer upon itself and easing insertion into and removal from the optical bench.

Figure 4B:
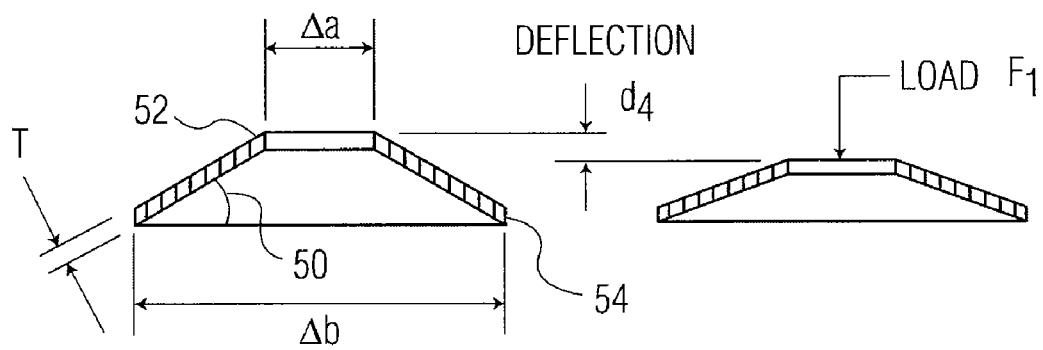
FIG. 4B shows longitudinal side views of a snap-ring washer or a belleville washer in a rest state and a compressed state.

Referring to FIG. 4B, the frusto-conical configuration may be slight or aggressive depending upon characteristics of the snap ring washer, such as diameter, thickness T and angle of deflection 50. The snap-ring washer has an inner circumferential side 52, with a width of $\Delta_a$, and an outer circumferential side 54, with a width of $\Delta_b$. When force $F_1$ is applied axially against the snap ring washer, the snap ring washer may be compressed by a distance $d_4$. This movement of the snap ring washer in an axial direction causes the snap ring washer to generate a restoring force proportionate to the applied load. The compression may continue, and the snap ring washer may be further compressed until it is substantially flat, thereby forming an angle of deflection which is approximately 0 degrees. Furthermore, deflection distance $d_4$ may be varied to meet a specific need by adjusting characteristics of the snap ring washer such as diameter, thickness T and angle of deflection 50.

Referring back to FIGS. 3A, 3B and 3C, the snap ring washer has an active mode, in which it is compressed to bias the threaded collar against the threaded inner surface; and an inactive mode, in which the snap ring washer is relaxed and applies no biasing force. Referring to FIG. 3A, an axial distance $d_1$ exists between the base and the shoulder. At this distance, the snap ring washer is relaxed and inactive. Referring to FIG. 3B, the lens cell has partially translated toward output end 26 thereby activating the snap ring washer. At distance $d_2$, the snap ring washer is engaged between the base of the threaded collar and the shoulder of the optical bench, thereby beginning to reduce backlash. Referring to FIG. 3C, at distance $d_3$, the lens cell has further compressed the snap ring washer against the optical bench to substantially flatten the washer. At distance $d_3$, the washer is still active and reduces backlash.

Figure 5:
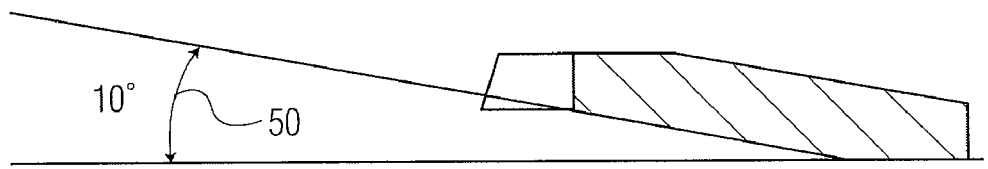
FIG. 5 shows a partial longitudinal view of a snap-ring washer or a belleville washer in which the angle of deflection is 10 degrees.
Figure 6:
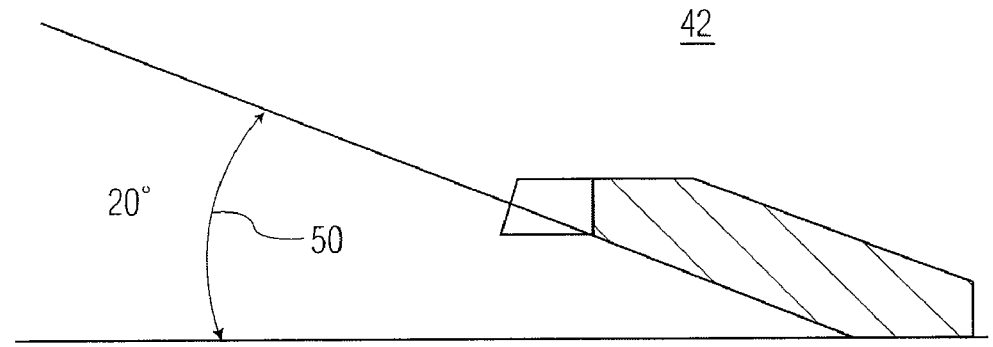
FIG. 6 shows a partial longitudinal view of a snap-ring washer or a belleville washer in which the angle of deflection is 20 degrees.

By way of example, the snap ring washers shown in FIG. 5 and FIG. 6 have an outer circumferential diameter of about 26.5 millimeters and an inner circumferential diameter of about 19 millimeters. Referring to FIG. 5, the snap ring washer has a 10 degree angle of deflection, which allows the snap ring to reduce backlash for a translation distance of 0.485 millimeters of the lens cell along the optical axis. As shown in Table 1, this amount of deflection is sufficient to reduce backlash when focusing upon objects that are greater than 1 meter away. When the objective lens cell is focused at a first distance from an object, the biasing element is in a relaxed mode of operation, and when the objective lens cell is focused at a second distance from the object, the biasing element is in a compressed mode of operation. According to one aspect of the invention, the first distance is greater than 100 meters from the object, and the second distance is less than 100 meters from the object. According to another aspect of the invention, the first distance is greater than 10 meters from the object, and the second distance is less than 10 meters from the object. The objective lens cell includes an optical center disposed between a focal plane of the objective lens cell and a rear vertex of the objective lens cell.

Referring to FIG. 6, the snap ring washer has a 20 degree angle of deflection, which increases the distance of deflection to 1.001 millimeters of lens cell translation along the optical axis. As shown in Table 1, this amount of translation distance is sufficient to reduce backlash, when focusing upon objects greater than 0.5 meters away. Those skilled in the art will recognize that other variations in angle, outer diameter, inner diameter and thickness T may be made to obtain the desired amount of deflection for a specific application.

Figure 7:
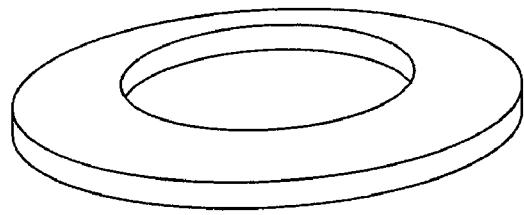
FIG. 7 shows a side perspective view of a belleville washer.
Figure 8:
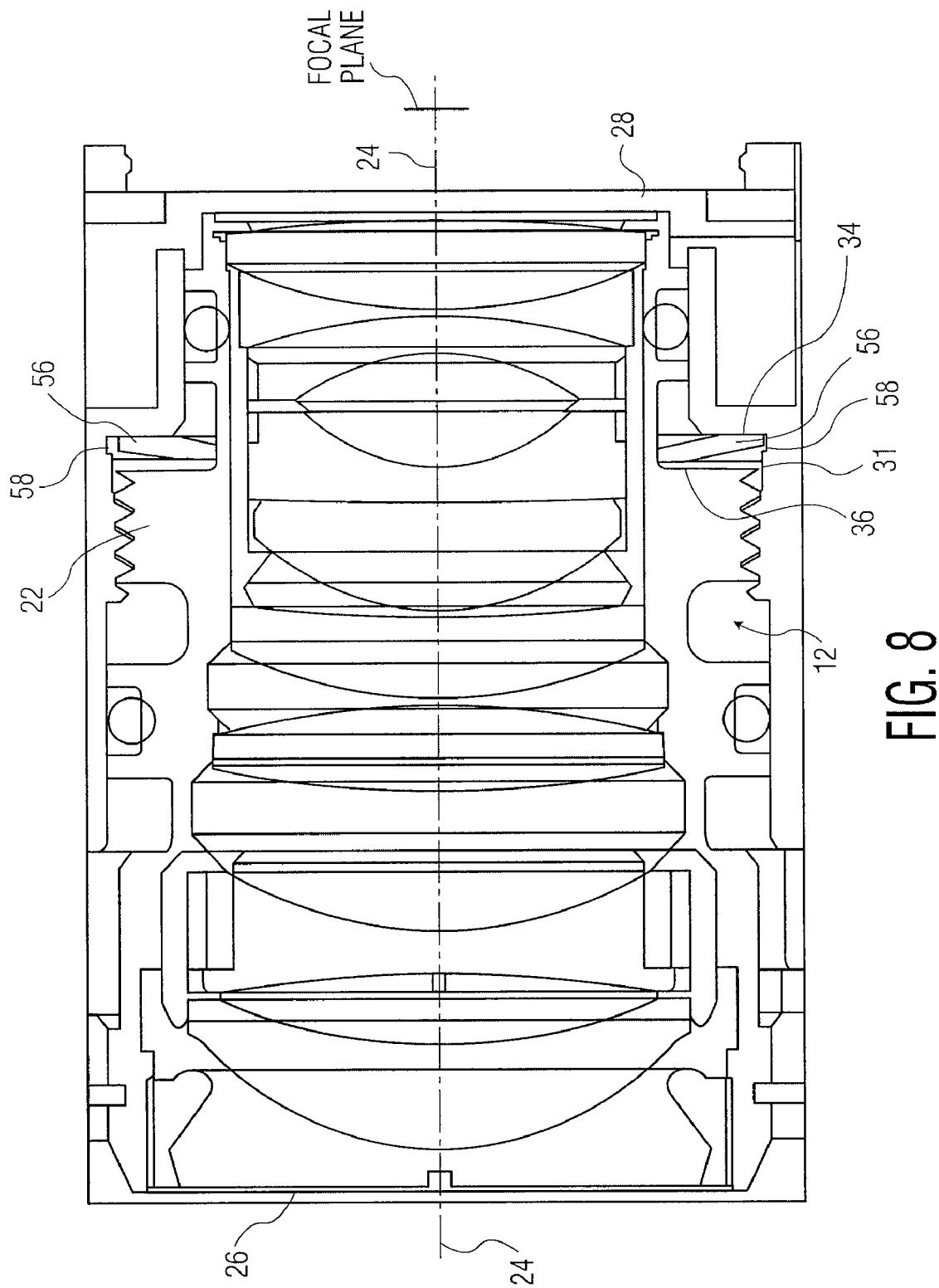
FIG. 8 shows a longitudinal side view of an objective lens assembly in which the housing includes a circumferential notch to receive a snap-ring washer or a belleville washer, in accordance to an embodiment of the present invention.

FIG. 7 shows belleville washer 56 characterized by a circular shaped body with a frusto-conical configuration including an inner diameter and an outer diameter. FIG. 8 shows another exemplary embodiment of the invention, in which the belleville washer may circumferentially surround the neck of the lens cell and occupy gap 30 between the base of the threaded collar and the shoulder of the optical bench. The belleville washer may be incorporated into the objective lens assembly by sliding the belleville washer onto the neck of the lens cell, prior to engaging the lens cell to the optical bench. This embodiment also provides deflection and reduces backlash in a manner similar to the snap ring washer.

According to yet another embodiment of the invention, the optical bench shown in FIG. 8 may alternatively include groove 58 that extends circumferentially along inner surface 31 of the optical bench. The groove 58 may be placed between the threaded inner surface of the optical bench and the shoulder of the optical bench. The groove may be sized to accept and retain the outer circumferential side of a snap ring washer or belleville washer of a given thickness T. The snap ring washer or belleville washer may be snapped into the groove so that it remains captive, when in its inactive state.

The present invention is advantageous over conventional lens assemblies because resolution settings in the objective lens assembly are maintained by preventing backlash. The present invention is further advantageous because only a small portion of the optical performance range needs to be maintained by using a space-efficient biasing member. The remaining portion of the focus range, in which the optical assembly is not sensitive to backlash, does not require elimination of backlash. Therefore, the present invention allows for the use of a space-efficient biasing member that performs during the desired optical range.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed:

1. An objective lens assembly comprising
an objective lens cell having a threaded portion;
an optical bench having a mating threaded portion for receiving the objective lens cell; and
a biasing element for reducing backlash between the objective lens cell and the optical bench,
wherein the biasing element includes a belleville washer or a snap ring washer; and
the objective lens cell includes a first wall radially extending away from an axial neck portion,
the optical bench includes a second wall radially extending toward the axial neck portion and oriented substantially parallel to the first wall,
the biasing element circumferentially surrounds the axial neck portion of the objective lens cell, and
the first wall and second wall define a gap for housing the biasing element; and
when the objective lens cell is focused at a first distance from an object, the biasing element is in a relaxed mode of operation, and
when the objective lens cell is focused at a second distance from the object, the biasing element is in a compressed mode of operation, and
wherein the first distance is greater than the second distance.

2. The objective lens assembly of claim 1 wherein
the biasing element is configured for a relaxed mode of operation and a compressed mode of operation,
in the relaxed mode, the biasing element is inactive, and
in the compressed mode, the biasing element reduces backlash between the lens cell and the optical bench.

3. The objective lens assembly of claim 1 further comprising
a circumferential groove formed on the inner surface of the optical bench and located between the first wall and the second wall for retaining the biasing element.

4. The objective lens assembly of claim 1 wherein
the first distance is greater than 100 meters from the object, and
the second distance is less than 100 meters from the object.

5. The objective lens assembly of claim 1 wherein
the first distance is greater than 10 meters from the object, and
the second distance is less than 10 meters from the object.

6. An objective lens assembly for a night vision goggle comprising
an objective lens cell having a threaded collar portion;
an optical bench having a mating threaded portion for receiving the objective lens cell; and
a biasing element for reducing backlash between the objective lens cell and the optical bench,
wherein the biasing element includes a belleville washer or a snap-ring washer; and
the objective lens cell includes an optical center disposed between a focal plane of the objective lens cell and a rear vertex of the objective lens cell, and
when the objective lens cell is focused on an object at infinity, the biasing element is in an inactive mode of operation, and
when the objective lens cell is focused on the object at a distance of 10 meters or less, the biasing element is in an active mode of operation; and
a distance between the focal plane of the objective lens cell and the rear vertex of the objective lens cell changes less than 100 microns over a change in focus distance to the object from infinity to approximately 10 meters.

7. The objective lens assembly of claim 6 wherein
when the biasing element is in the inactive mode of operation, the biasing element is in a relaxed mode, and
when the biasing element is in the active mode of operation, the biasing element is in a compressed mode.

8. The objective lens assembly of claim 7 wherein
a notch is formed in the optical bench for capturing the biasing element, and
the notch is configured to capture the biasing element in the active and inactive modes of operation.

9. The objective lens assembly of claim 6 including
a photocathode for receiving light from the object, transmitted through the objective lens cell,
wherein the focal plane of the objective lens is at an input surface of the photocathode.

10. The objective lens assembly of claim 6 wherein
the biasing element is inactive over the change in focus distance to the object from infinity to approximately 10 meters.

11. The objective lens assembly of claim 6 wherein
the biasing element is active over a change in focus distance that corresponds to a gap distance less than 2-3 mm.

* * * * *